May 14, 1957 C. J. LUCIA 2,792,078
FLUID SYSTEM AND BY-PASS CONTROL VALVE
Filed July 15, 1953 2 Sheets-Sheet 1

Fig.1.

INVENTOR.
CARROLL J. LUCIA
BY
Wilson and Redrow
ATTORNEYS.

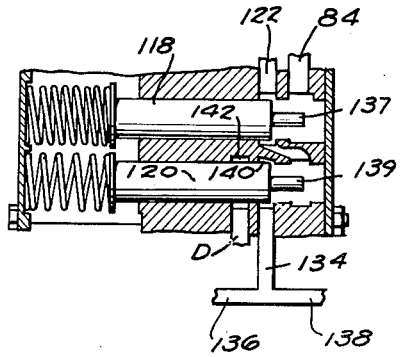
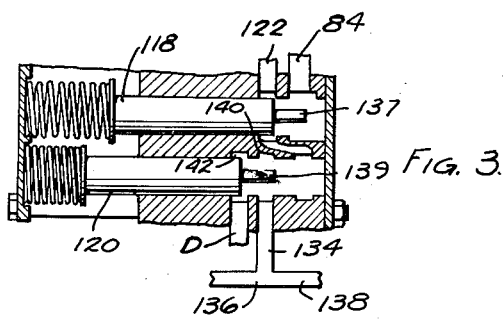
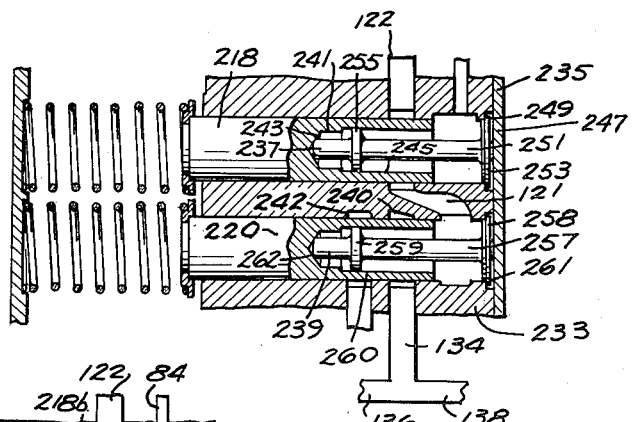
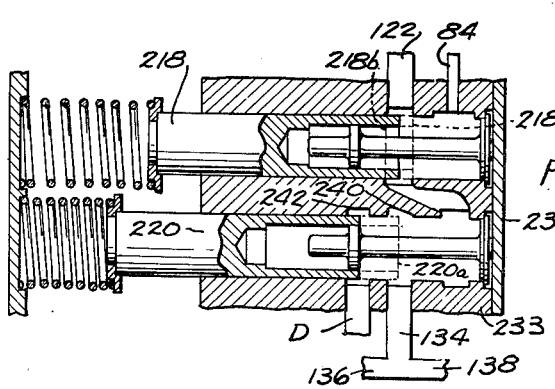

United States Patent Office 2,792,078
Patented May 14, 1957

2,792,078

FLUID SYSTEM AND BY-PASS CONTROL VALVE

Carroll J. Lucia, Birmingham, Mich., assignor to Studebaker-Packard Corporation, a corporation of Michigan Application July 15, 1953, Serial No. 368,197

20 Claims. (Cl. 184—6)

The present application relates to an automatically by-passed type of valve controlled fluid circulating system and to a by-pass control valve incorporated therein and forms a continuation in part of my co-pending application Ser. No. 347,303, Carroll J. Lucia, filed April 7, 1953, issued December 27, 1955 as U. S. Patent 2,728,241.

An object of the invention is the provision of a by-pass type hydraulic circulating system which includes series and parallel arranged intermittent and continuous fluid receiving devices and in which a pair of singly and dually functioning single valves coacts to control the proper by-passing of fluid with respect to each of said devices; according to one feature of this hydraulic circulating system one such valve constitutes a fluid pressure regulator acting primarily as a pressure releasing dump valve and through the action and cooperation of the other valve certain of the fluid receiving devices draw on the thus released dumped fluid as their sole source of fluid supply. In such fashion the latter devices function in their intended capacity as the sole result of fully utilizing the otherwise wasted energy laden pressure fluid inherently necessarily dumped by the pressure regulator.

In their preferred form, the actual physically constructed specimens of the two presently disclosed embodiments of the invention incorporated an intermittently fluid consuming clutch applying control as the primary fluid receiving device, which was arranged in a first fluid branch hydraulically in parallel with respect to a second branch containing a pair of series connected filter and bearing devices serving as secondary substantially continuous fluid receiving devices. The first branch was kept under a pressure of up to approximately 100 p. s. i. and under the automatic pressure regulation as offered by a pressure relieving dump valve was set to dump fluid at pressures tending to exceed 100 p. s. i. into the second branch containing the secondary devices. The thus dumped fluid introduced into the second branch was in turn controlled by a second automatic valve so as to supply the filter and bearing devices substantially continuously with fluid so long as the respective pressure drops thereacross did not exceed approximately 50 and 60–80 p. s. i.; roughly at an increasing pressure of 50 p. s. i. the second valve operated to by-pass the filter device and at 60–80 p. s. i. as appropriate the second valve by-passed both the filter and the bearing devices, and the details of this sequence of operations are fully set forth in my aforementioned co-pending application Serial No. 347,303, filed April 7, 1953.

Another object of the invention is the provision of duplex valve structure comprising a pair of slide valve elements disposed in the parallel bores of a common unitary valve body in which the inlets to the bores are at a common end of the structure and the valve controlled outlets are at intermediate points in the bores in a common transverse plane and are so connected that the inlet of one bore is supplied from the valve controlled outlet of the other bore. According to a present feature the valve element in the latter bore also controls a split path for leading a supply of fluid to a filtering receiver and the other valve element controls by-passing of the filtering receiver.

A further object of the invention is to provide a restrictively damped spring loaded valve which is pressure actuable at one end and has only a portion of the area of such end restrictively damped and the remaining portion continuously exposed to the unrestricted actuating pressure; the portion thus remaining, being continuously exposed to the actuating pressure, is effective to render the valve motion-responsive to high pressure surges, and such portion in conjunction with the portion of damped area renders the valve motion-responsive to low sustained pressures. However, momentary pressure surges of a low magnitude are ineffectual to reach the restrictively damped portion of the end area and the valve is freed from a tendency to hunt and ultimately perhaps cause a fatigue failure in the spring which furnishes the spring load thereon; moreover the safety feature of a safety valve which unloads at dangerous high pressures even if momentary is fully present in the valve hereof.

A further object is to provide in a spring loaded pressure movable valve for automatically diverting the flow of a fluid, a piston-containing damping dashpot which continually communicates with the flowing fluid and with respect to which the body of fluid being displaced and replenished by the damping piston is continuously being mingled with and freshened by the flowing fluid; accordingly a self-purging action results tending to overcome the likelihood for changes to result in the viscosity of the trapped fluid as in cases for instance as where the damping chamber fluid is hydraulically isolated from a stream of flowing fluid and in time becomes more viscous due to oxidation, ordinary decomposition, precipitation, gum formation, carbonization or sludging or other naturally following processes.

An additional object is to provide a dually functioning single valve element which, in conjunction with a singly functioning single valve element, receives pressure fluid and uncovers various ports progressively in the path of reciprocation thereof so as to by-pass various devices connected to such ports in a predetermined sequence of by-passing.

Another object according to at least one species of the invention, is the provision of a multi-element unitary valve structure in which the movable elements operate in sequence and each incorporates a self-contained damping dashpot.

Further features, objects and advantages will either be specifically pointed out or become apparent when for a better understanding of the invention reference is made to the following written description taken in conjunction with the accompanying drawing in which Fig. 1 is a schematic fragmentary showing the components of an automatically by-passed type fluid system incorporating pressure movable automatic by-pass valves according to the present invention;

Figs. 2 and 3 are fragmentary views of the progressive sequence of opening of the by-pass valves of Fig. 1;

Fig. 4 is a fragmentary view of a modification in which the control valves are partially damped in their operation; and Fig. 5 is a fragmentary view of the valves of Fig. 4 in opened position.

In Figs. 1, 2, 3 of the drawings a hydraulically controlled marine transmission 30 is shown for driving a propeller carrying shaft 32. Primarily intended as propulsion machinery for a boat, the transmission 30 used may be of the cluster gear type having two forward and reversely driving power trains and includes an inner central shaft 174, a stationary pinion carrier 218 for carrying cluster gears, and an output ring gear 248 meshing with each gear cluster all as more particularly pointed out in my aforementioned application Serial No. 347,303. The transmission 30 is engine driven by the boat engine, not shown, through an appropriate connection to a combined rotatable flywheel and clutch housing 50 at the front of the transmission. The housing 50 has a set of starting gear teeth 52 mounted to the periphery thereof and includes a stack of three bolted together annular plates comprising an end plate 54 carrying the set of teeth 52, another end plate 56, and an interposed central plate 58 having a smooth friction face 60 on one side and a corresponding friction face 62 on the other side. The friction faces 60, 62 have a pair of frictionally engageable wear surface members 64, 66 respectively adjacent thereto, the members 64, 66 being mounted in the housing 50 so as to be readily shiftable axially as a unit and independently rotatable with respect to one another and with respect to the housing 50, all as more particularly described in my aforementioned application Serial No. 347,303. Each of the end plates 54, 56 is provided with an annular recess; a front pressure actuable piston 68 is receivably keyed in the recess for the plate 54 and a rear pressure actuable piston 70 is receivably keyed in the recess for the plate 56.

As viewed from a position astern of the propeller carrying shaft 32, the engine driven transmission 30 will be provided with a boat engine assumed to be of the non-reversible type and to have a normal clockwise direction of rotation and the propeller shaft 32 is arranged to drive the boat ahead when the shaft is driven in a clockwise direction. The rotatable clutches 64, 66 in the transmission 30 may be selectively operated and each driven in the clockwise direction of rotation of the engine driven housing 50 and when the front piston 68 is pressure actuated in the housing 50 the wear surface member 64 is clamped to the friction face 60 on the central plate 58 and caused to rotate clockwise and the propeller carrying output shaft 32 is likewise caused to be rotated as viewed from astern thereof, in a clockwise direction due to the forward driving action of one of the two-named power trains in the cluster gear type of transmission 30. The propeller carrying shaft 32 accordingly tends to drive the boat ahead.

Alternatively, pressure actuation of the rear piston 70 and the resulting forced clockwise rotation of the wear surface member 66 causes the propeller shaft 32 to be rotated in counterclockwise direction due to the reverse driving action of the other power train provided by the noted cluster gears of the transmission 30 and the propeller carrying shaft 32 tends to drive the boat astern. The front piston 68 and its surrounding recess in the plate 54 cooperate to define a movable wall type of working chamber 72 which is pressurizable to force the front piston 68 rearwardly in the direction of the friction face 60 so as to clamp the wear surface member 64 therebetween. Similarly, the rear piston 70 cooperates with the recess in the plate 56 to define a movable wall type of working chamber 74 which is pressurizable to force the piston 70 forwardly in the direction of the friction face 62 so as to clamp the wear surface member 66 in drive establishing engagement therebetween. Selective pressurization of the working chambers 72, 74 is accomplished through the operation of a hydraulic control system which is operator operated by means of a valve controlling lever 76. The lever 76 has a neutral position shown by solid lines in Fig. 1 from which it is selectively manually shiftable into a forward drive position shown by the dotted lines 76a and into a rearward drive position shown by the dotted lines 76c. The lever 76 is keyed to a rockshaft 77 carrying another lever attached by means of a pin and guide connection 86 to a drive selector valve 78.

The drive selector valve 78 controls the application of hydraulic pressures in the hydraulic system and is supplied by a pipe 80 which forms one branch of a pump discharge pipe 82 having another branch 84. The pump discharge pipe 82 is connected to the pressure side 88 of a pump schematically shown at P which may be of the spur gear type. The pump P is arranged to circulate oil, glycerine or other suitably compounded lubricant or pressure fluid and under a predetermined regulated pressure of approximately 100 p. s. i. according to one physically constructed embodiment of the present illustrative example of the invention. The pump P has a suction side which is connected to an intake pipe 90 leading from a reservoir 92. The reservoir 92 is provided with a plurality of drain receiving lines D'. The drive selector valve 78 comprises a spool type shiftable element adjustably positioned through action of the lever 76 and including a central land 94 and a pair of spaced apart end lands 96, 98. In the neutral position shown in Fig. 1, the central land 94 closes off the valve supply pipe 80, a drain line D adjacent the end land 96 is open, and a drain line D adjacent the end land 98 is open. Each of the drain lines D is connected to one of the drain lines D' provided on the reservoir 92.

A pipe 100 leads from the valve 78 to an automatic clutch control valve V which controls a drain line D connected to a drain line D' on the reservoir 92. The control valve V is connected for conjoint rotatable movement with the clutch housing 50 and is pressure actuable so as to be automatically shiftable radially inwardly with respect thereto. The pressure which exists in the pipe 100 when the case 50 rotates is the combined pressure produced by the pump P and the centrifugally acting force on the mass of oil in the radially extending components of the pipe 100 leading to the control valve V. Operation of the control valve V, more completely set forth in my aforementioned application Serial No. 347,303. is dependent on centrifugal force and is such as to connect the pipe 100 to a pipe 102 leading to the working chamber 72 for the forward piston 68 in the rotating clutch housing 50. A pipe 104 is connected by an automatic clutch control valve V, similar to the previously noted control valve V, to a pipe 106 leading to the working chamber 74 for the rear piston 70. The operation of the control valve V connected between the pipes 104 and 106 is such that in the position shown in Fig. 1 the pipe 106 freely communicates with a drain line D connected to the valve and the pressure in the pipe 106 is fully vented or released. The just noted drain line D is connected to a drain D' located on the reservoir chamber 92. The pipe 100 is also connected by means of a passage 108 having a precalibrated restriction therein, to the open side of a valve 110 through which pressure fluid is introduced into a pipe 112 leading to a thrust opposing fluid container C at one end of the propeller shaft 32. The pipe 104 has a passage 114 provided with a precalibrated restriction therein leading to the closed side of the valve 110 which if not in the closed position shown would place the passage 114 in communication with the pipe 112 leading to the fluid container C. The purpose of the restrictive effect of the passages 108 or 114 as the case may be is to prevent sudden shock to the hydraulic system and temporary loss of back pressure therein whenever the operation is such as to call for filling the fluid container C. The valve 110 is selectively shiftable into the dotted line position 116 all as more particularly pointed out in the aforementioned co-pending application Ser. No. 347,303 in the portion of the description thereof relating to the thrust opposing fluid container C.

The previously considered branch passage 84 leading from the pump discharge line 82 is connected by means of a pressure actuable single shiftable valve 118, a passage 121, and a pressure actuatable single shiftable valve 120 to a drain line D which is adjacent the latter valve and which is conected to a suitable drain connection D' on the reservoir 92. The valve 118 which is spring biased by a spring at its rear end as shown in Fig. 1 is a pressure regulator serving as a pressure releasing dump valve to dump the pumped fluid not only into the passage 121 but also into a pipe 122 which leads to an oil filter device 124. At those times in which the intermittently pressure actuated pistons 68 and 70 are being pressurized and then set in motion, the pressure movable valve 118 assumes a normally closed dotted line position as shown by the dotted lines 118a in Fig. 1 due to the fact that there is a drop in pressure in the branch passage 80 and a consequent drop in pressure in the branch passage 84 until such time as the pump P can recover and replenish the fluid under appropriate 100 p. s. i. pressure in the system. The usual status of the present hydraulic circulating system occurs after the initial assumption of the selector lever 76 into one of the two operating positions 76a or 76c whereafter the intermittent pressure fluid consuming chambers 72 and 74 have time to be completely filled. In such usual status the valve 118 assumes the solid line intermediate position shown in Fig. 1 in which the pipe 122 and the pipe 121 are both restrictively supplied by the branch passage 84, certain minor adjustments from such position being automatically compensated for by the valve 118 which is motion responsive to minor pressure fluctuations as well as to major pressure fluctuations.

The transmission 30 includes a system of anti-friction bearing devices such as at 126 and 125, 127 which are each hydraulically series connected with the oil filter 124 on the downstream side thereof by means of a pipe 128 serving a set of individual branches 130, 132 leading from a series of sections of pipe 131, 136 and 138. The anti-friction bearing 126 is carried by the stationary pinion carrier 218 and supports the previously noted ring gear 248 for rotation with respect thereto. The span of anti-friction bearings 125, 127 is mounted in the transmission 30 for rotatably supporting the inner central shaft 174. The bearing 126 and the other bearings 125, 127 as through the pipes 136, 138, 132 are thus provided with filtered oil as schematically illustrated in Fig. 1 and are individually or collectively served with drains D as shown which lead to a suitable drain connection D' on the reservoir 92.

The valve elements 118, 120 are slidably received in a pair of vertically spaced parallel bores formed in a unitary valve body 133 having an end plate 135 detachably secured at one end thereof by a set of one or more studs and nuts 141. The inlets to each of the parallel bores are at the just noted end of the valve body 133 and three transversely arranged outlets for the bores are arranged substantially in a common plane. The lowermost outlet is indicated at 134 and is connected at a T fitting to the pipes 136, 138 and the middle outlet is connected by the passage 121 so as to communicate with the inlet to the lowermost bore. An annular recess 140 is formed in the lowermost bore and is so arranged when uncovered by the valve element 120 upon the latter's assuming the dotted line position 120a, as to be effective to by-pass the oil filter 124. The lowermost bore is provided with another annular recess 142 which in company with the recess 140 has a common junction provided by the lowermost bore itself at such time as the valve 120 assumes the wide open position shown by the dotted lines 120b. Such common junction between the recesses 140 and 142 will be noted to lie on the downstream side of the upper valve 118. The valve elements 118, 120 are provided with integral tubular protruding studs 137, 139 acting as stops for movement of the valves upon engagement of the studs with the end plate 135.

It is apparent that the pipes 122 and 128 serve as the respective inlet and outlet for the oil filter 124 and that the passages 121 and 134 which are interconnected by the recess 140 controlled by the valve 120 serve as a by-pass conduit for by-passing oil around the filter 124. The valve 120, effective as a pressure relief valve, is spring biased by a spring at its rear end as shown in Fig. 1 and is pressure actuated at the forward end which is exposed to oil pressure. The position shown by solid lines in Fig. 1 is the unactuated position. In its intermediate dotted line position 120a shown by dotted lines in Fig. 1, the valve 120 completely by-passes the oil filter 124 but in normal operation may only partially cover (as shown in Fig. 2) or even fully cover the recess and passage 140, 134 so as to restrict or prevent such by-passing effect. The former condition represented by Fig. 2 prevails when the filter 124 becomes progressively dirty and the latter condition prevails when the filter is clean or nearly so. It is only when the filter 124 becomes fully plugged that the valve 120 completely by-passes the same.

In the solid line position taken by the valve element 120 in Fig. 3, the bearings 126, 125, 127 are being partially by-passed and it will be noted that the drain passage D and the passage 134 adjacent the valve 120 are so arranged that when they are unrestrictively connected through the operation of the valve 120 the system of bearings in the transmission 30 is completely by-passed. The position of complete by-pass and complete relief of pressure for these bearings is shown by the dotted line position 120b in Fig. 1. Such a drastic relief of pressure by the valve 120 would be necessary for example in the instance of completely plugged bearings or in the instance of an undue generation of pressure of oil in the system even if only temporary. When both of the valves 118, 120 are fully open, the intermittently actuated clutch servo chambers 72 and 74 controlled at 78, the continuously served oil filter 124, and the system of bearings such as at 125, 126, 127 are completely by-passed.

In normal operation the flow path for all fluid from the branch passage 84 is through the pipe 122, through the filter device 124, and through the pipes 128, 131, 136, 138 to the various bearing feeding branches 130, 132 and thence into the bearings respectively at 126 and 125, 127 and to the drains D; the valve 118 assumes an intermediate position as shown in solid lines in Figs. 1, 2 and 3 and regulates the back pressure in the fluid lines 84 and 80 at a magnitude of about 100 p. s. i. for instance. On such basis the companion dually functioning relief valve 120 is arranged to assume the intermediate position 120a, Fig. 1, so as to by-pass the oil filter 124 when the upstream pressure as in the passages 121 and 122 exceeds 50 p. s. i. according to one physically constructed embodiment of the invention; the valve 120 is arranged to assume the fully opened position 120b, Fig. 1, when the condition of the back pressure in the passages 121 and 122 was such, according to the referred to embodiment, that it exceeded 60-80 p. s. i. The latter condition is an extreme condition and probably occurs only under the circumstances of a drastic surge in the hydraulic system or else due to a set of fully plugged bearings or at least a set of completely plugged spray jets, not shown, which are sometimes used in conjunction with anti-friction bearings of the present type and other type bearings.

The valve operating lever 76 has a neutral or ineffective position disposed between the two active positions shown at 76a and 76c in Fig. 1. When the lever 76 is moved into the dotted line position 76a for forward drive, the central land 94 thereof uncovers the fluid supply pipe 80 for the selector valve 78 and establishes communication through the passage 100, the control valve V, and the passage 102 to the working chamber 72 adjacent the forward piston 68. Under the force of fluid pressure the piston 68 is moved rearwardly so as to clamp the wear surface member 64 against the friction face 60 and cause forward drive to be established through the transmission 30. The end land 98 at the same time covers the drain line D adjacent thereto whereas free communication is permitted from the pipe 104 to the drain line D adjacent the land 96. Pressure in the passage 100 is also communicated through the restricted conduit 108 and through the open side of the valve 110 to the passage 112 for communicating pressure fluid into the fluid container C at a pressure in proportion to the actuating pressure affixed in the working chamber 72. Due to the pressure thrust in the fluid container C a proportional reaction force is exerted as against the forwardly thrusting propeller connected output shaft 32 for the transmission 30. Full pump pressure from the pump discharge 88 may thus be effectively applied to the working chamber 72 and to the fluid container C. The reverse drive position shown by the dotted lines 76c correspond to the extreme rearward position for the lever 76 as compared both with the forward position indicated by the dotted lines 76a and with the neutral position indicated by the solid line showing therefor in Fig. 1. The consequences of moving the lever 76 to the reverse drive position are that the central land 94 on the shiftable valve element uncovers the inlet 80 for the control valve 78 and directs pressure fluid through the passage 104 through the control valve V and through the passage 106 into the working chamber 74 behind the rear piston 70. Accordingly, the rear friction element 66 is clutched in drive establishing engagement. At the same time the end land 96 covers the drain line D adjacent thereto. The passage 100 is connected to drain through the drain D adjacent the end land 98 for the valve and accordingly pressure is vented from the fluid container C and such released fluid passes through the passage 112, the open side of the valve 110, the restricted conduit 108, and the valve 78 to the drain D of the latter adjacent the end land 98.

Means may be provided according to the modification of Figs. 4 and 5 to prevent hunting of the spring-biased valves due to repetitive low pressure surges and a consequent imposition of fatigue stresses on the biasing springs therefor. In such modification a pair of independently slidable valve elements 218, 220 is reciprocably received in a corresponding pair of vertically spaced adjacent parallel bores formed in a common unitary valve body 233. The upper bore is supplied at one end by means of a pipe 84 leading from a pump discharge and the lower bore is supplied at one end by means of a passage 121 leading from the outlet of the upper bore. The outlets for the respective bores are transversely arranged and disposed substantially in a common plane. A branch outlet passage 122 from the upper bore is arranged to lead to a filter device and the outlet passage 134 leading from the lower bore is connected to a pair of passages 136 and 138. The passage 136 is adapted to be connected to the filter device outlet as in the showing of Fig. 1 and also to an anti-friction bearing lubricating line 131, 130. The pipe 130 is adapted to be connected by means of a pipe 132 as in Fig. 1 to further anti-friction bearings. The upper valve element 218 has an axially extending recess 241 formed therein and provided with a floor 243. The valve body 233 is provided with a confronting recess 247 which is reduced at its inner most end to provide a shoulder 249. A tubular shanked stud or rod 251 is provided which is upset so as to have an integral round enlarged head 253 which is anchored in the recess 247 owing to being clamped between the shoulder 249 and an end plate 235 provided for the valve body 233. The stud 251 has an extremity 237 serving as a stop means upon engagement with the floor 243 of the recess in the valve 218. The recess 241 is counterbored as at 245 so as to provide a cylinder for receiving a loosely fitting piston portion 255 formed as a circular lateral protrusion integral with the stud 251. The lower valve receiving bore is similarly recessed to receive the integral round enlarged head 258 of a tubular shanked rod or stud 257 which is clamped between a shoulder 261 and the plate 235. A confronting recess is formed in the valve element 220 and provides a floor 262. An extremity 239 at the end of the stud 257 provides a stop means engageable with the floor 262 of the recess, and the recess has a counterbore 260 forming a loose fit with a slidably received piston 259 formed as a laterally protruding integral circular portion of the stud 257. The valve 220 is arranged to uncover an annularly recessed outlet 240 serving as a by-pass for the above referred to filtering device and also to uncover an annularly recessed outlet 242 serving as a by-pass for one or more bearing devices served by the pipes 136, 138 and being longitudinally spaced apart with respect to the outlet 240. In Fig. 5 the dotted line valve position shown at 220a corresponds to a partially uncovering position with respect to a drain line D for by-passing the filtering device and the solid line showing corresponds to the by-passing position for partially uncovering the recess 242 and by-passing both the filtering device and the bearing devices. The noted drain line D adjacent the lower bore is arranged to be connected to a corresponding drain line D' as on the reservoir 92 of Fig. 1. The main chamber in the lower bore serves as a portion in common to the annular recesses 240, 242 for merger of the same at a point downstream of the upper valve 218. In one physically constructed embodiment of the modification of Figs. 4 and 5 the spring biased upper valve element 218 was provided with a biasing spring as shown having a spring rate of 27.6 lbs. per inch and the biasing spring for the lower valve element 220 had a like spring rate of 27.6 lbs per inch. These figures are only illustrative, however, and as being further illustrative of tangible dimensions of the physical embodiment the parallel valve bores for each valve element had a ¾ in. diameter and the damping cylinder counterbores therein for slidably receiving the damping pistons were ½ inch in diameter. The loosely fitting pistons 255, 259 were adapted to have a diameter of between .004 and .008 inch smaller than the diameter of the damping cylinder so as to insure a loose fit and form in effect a shuttle passage means in the clearance space between the outer periphery of the piston and the inner wall of the cylinder. In the present illustrative data on such actual physical embodiment, the upper and lower springs were preloaded respectively at 37.1 lbs. and 11.7 lbs. in the closed position of the valves and the upper valve 218 was arranged to begin to open at about 100 p. s. i. continuous pressure and the lower valve 220 was arranged to begin to open the annular recess 240 at approximately 50 p. s. i. continuous pressure and arranged to begin to open the annular recess 242 at approximately 80 lbs. p. s. i. continuous pressure. Full valve travel for the upper valve element 218 was 9/16 in. and full valve travel for the lower valve element 220 was 1 1/16 in.

In the modification of Figs. 4 and 5 it will be noted that the damping piston and cylinder combinations 255, 245 and 259, 260 are effective to damp only a portion of the end area of the respective slidable valve elements 218, 220. That is to say the transverse area of the extremity of the valve elements 218, 220 in immediate proximity to the end plate 235 is continuously exposed to the respective inlet fluid pressures whereas the area of the transversely offset portion at the bases of the cylinders 245, 260 and the floors 243 and 261 are restrictively damped. In order for fluid pressure to be effective on the transversely offset area of the valve such fluid must restrictively bleed through the shuttle passage means afforded by the clearance between the respective pistons 255, 259 and the cylinders 245, 260. Accordingly the valves 218, 220 are unresponsive to low pressure surges even though these valves are pressure actuable at low or high steady pressures and at high pressure surges; the low pressure surges do not have an opportunity to bleed past the pistons 255 or 259 and hence cannot act over enough end area of the valve in order to overcome the pre-loaded springs and shift the position of the valves. High pressure surges, however, acting solely on the extreme end area of the valve are sufficient to move the same and enduring low pressures are sufficient to move the same provided they are given enough time to bleed past the pistons 255 or 259 into the space adjacent the floors 243 and 261 so as to thrust against the latter.

In common, the valves of the modifications of Figs. 1-3 and Figs. 4, 5, inclusive are arranged to have their inlets at one common end of the valve body 133, 233 and have intervening outlets disposed so as to be transversely arranged and substantially in a common plane. Each of the upper valves 118, 218 of these modifications has one outlet along its path of reciprocation between ends of the valve body and the valve 120, 220 has two longitudinally spaced outlets along its path of reciprocation between ends of the valve body. In both cases, the overall operation of the hydraulic circulating system is essentially the same. That is to say a pump supplied recirculating fluid system is provided in which an intermittent fluid consuming device 50 is connected through a selector valve 78 to the pump discharge 88; a conduit 84, 122, 128, and 131, 130, or 136, 138, 132 and D is connected in parallel to such device 50 and includes a pair of series connected filter and bearing devices 124 and 126 through which fluid is circulated and further includes a pressure movable single valve 118 or 218 between the pump discharge 88 and the series connected devices for opening at about 100 p. s. i. to release pressure fluid into the conduit in response to a predetermined pump discharge pressure. The by-passes 140 and 142 connect the respective inlets and outlets of the pair of devices 124, 126 and have a common portion of merger in the bore for the valve 120 downstream of the point of inclusion of the valve 118; a pressure movable single valve 120 is slidably related to such common portion so as to open one or both of the by-passes 140, 142 in response respectively to a pressure of 50 lbs. which is lower than the 100 lbs. blow-off pressure for the valve 118 and to a pressure of 60–80 lbs. which is intermediate the 50 p. s. i. and 100 p. s. i. pressures.

As herein disclosed the second body-and-valve embodiment of the invention having the clearance damping type of piston and cylinder arrangement, is shown to have the damping piston carried by the stationary valve body and the cylinder affixed to or integrally formed in the moving valve element. It is evident that the cylinder can be arranged as a stationary element with respect to the body and that the damping piston can be connected so as to reciprocate with the valve element. So also the drawing shows the piston and cylinder area to be less than the cross-sectional area of the shiftable valve element but self-evidently if greater damping is required the piston and cylinder area may be made larger to a point of even being equal to or greater than the valve area and in addition the clearance between the piston and valve can be decreased so as to increase the damping effect. Though such clearance does in fact provide shuttle passage means due to the inherent toleration of these parts, other forms of shuttle passage means may be relied upon such as grooves scored in the cylinder walls, serrations formed in the circular periphery of the piston, or in intercommunicating passage-connected ports formed in the cylinder walls at spaced apart points one on each side of the path of motion of the piston with respect to the cylinder walls. The second stage or lower by-passing valve 120, 220 of both embodiments is shown to have two longitudinally spaced recessed outlet by-passes or ports along its path of reciprocation so as to serve only two series connected filter and bearing devices but indeed it is not essential to the invention that only two ports and two series connected devices be used and three or more ports and by-passed devices of the corresponding number may be equally employed to advantage and for that matter only one port and one by-passed device may conceivably be employed.

Variations within the spirit and scope of the invention described are equally comprehended by the foregoing description.

I claim:

1. In a pressure controlled valve assembly, in combination with means forming a valve chamber provided with an end passage adapted to receive pressure fluid and an outlet intermediate the ends of the chamber, an outlet-covering pressure-movable valve slidable from its outlet covering position within the chamber to open the outlet thereof and having one end portion relatively adjacent said end passage, said one end portion having means stopping movement thereof short of the location of the end passage and being continuously exposed to the pressure-fluid-pressure therein, a cylindrical recess centrally formed in said one end portion of the valve having the floor thereof axially offset from the transverse end surface of the end portion, means damping only a portion of the area of the valve for selectively impeding movement of the same comprising a stationary piston loosely fitting within the recess to define permanently open shuttle passage means leading from one side of the piston to the other for restrictively conducting pressure fluid between the pressure-supplied end of the valve chamber and the space between the floor of the recess and the piston, and means engaging the valve and yielding so as to move therewith both under the influence of sustained relatively low pressures effective against the combined area of the floor of the recess and the transverse end surface aforesaid and under the influence of momentary relatively high pressures as they occur in the pressure fluid to which the transverse end surface of the valve is continually exposed, said last-named means comprising a biasing element preloaded in a direction to supplement the motion-impeding action of the shuttle passage means in opposition to the fluid pressure and of a magnitude to render the valve unresponsive to relatively low pressure surges.

2. In a pressure controlled valve assembly, in combination with means forming a valve chamber provided with an end passage adapted to receive pressure fluid and an outlet intermediate the ends of the chamber, an outlet-covering pressure-movable valve slidable from its outlet covering position within the chamber to open the outlet thereof and having one end portion relatively adjacent said end passage, said end portion having means stopping movement thereof short of the location of the end passage and being continuously exposed to the pressure-fluid-pressure therein, a recess formed in said one end portion of the valve having the floor thereof axially offset from the transverse end surface of the end portion, means damping only a portion of the area of the valve for selectively impeding movement of the same comprising a stationary piston fitting within the recess, permanently open shuttle passage means leading from one side of the piston to the other for restrictively conducting pressure fluid between the pressure-supplied end of the valve chamber and the space between the floor of the recess and the piston, and means engaging the valve and yielding so as to move therewith both under the influence of sustained relatively low pressures effective against the combined area of the floor of the recess and the transverse end surface aforesaid and under the influence of momentary relatively high pressures as they occur in the pressure fluid to which the transverse end surface of the valve is continually exposed, said last-named means comprising elastic means pre-loaded in a direction to supplement the motion-impeding action of the shuttle passage means in opposition to the fluid pressure and of a magnitude to render the valve unresponsive to relatively low pressure surges.

3. In a pressure controlled valve assembly, in combination with means forming a valve chamber provided with an end passage adapted to receive pressure fluid and outlets intermediate the ends of the chamber, an outlet-covering pressure-movable valve slidable from its outlet covering position to progressive positions within the chamber to open one or all of the outlets thereof in succession and having one end portion relatively adjacent said end passage, said end portion having means stopping movement thereof short of the location of the end passage and being continuously exposed to the pressure-fluid-pressure therein, a recess centrally formed in said one end portion of the valve having the floor thereof axially offset from the transverse end surface of the end portion, means damping only a portion of the area of the valve for selectively impeding movement of the same comprising a stationary piston within the recess, permanently open shuttle passage means leading from one side of the piston to the other for restrictively conducting pressure fluid between the pressure-supplied end of the valve chamber and the space between the floor of the recess and the piston, and means engaging the valve and yielding so as to move into said progressive positions therewith both under the influence of sustained relatively low pressures of differing magnitudes effective against the combined area of the floor of the recess and the transverse end surface aforesaid and under the influence of momentary relatively high pressures of differing magnitudes as they occur in the pressure fluid to which the transverse end surface of the valve is continually exposed, said last-named means comprising a wire spring pre-loaded in a direction to supplement the motion-impeding action of the shuttle passage means in opposition to the fluid pressure and of a magnitude to render the valve unresponsive to relatively low pressure surges.

4. In a pump-supplied fluid system, an intermittent fluid-consuming device connected to the pump discharge, a conduit connected in parallel to said device and including a pair of series-connected devices having inlets and outlets and through which fluid is circulated, said conduit further including a pressure movable single valve means between the pump discharge and the series-connected devices for opening to release pressure fluid into said conduit in response to a predetermined pump discharge pressure, two by-passes connecting the respective inlets and outlets of the above enumerated pair of devices and having a common portion of merger downstream of the point of inclusion of said means in said conduit, and pressure movable single valve means slidably related to said common portion to open one or both of the by-passes of the series-connected devices in response respectively to a predetermined pressure relatively lower than the first-said predetermined pressure and to a pressure of intermediate magnitude in comparison to said predetermined pressures.

5. In a pump-supplied fluid system, an intermittent fluid-consuming device connected to the pump discharge, a conduit connected in parallel to said device and including a pair of series-connected devices having inlets and outlets and through which fluid is circulated, said conduit further including means between the pump discharge and the series-connected devices for opening to release pressure fluid into said conduit in response to a predetermined pump discharge pressure, two by-passes connecting the respective inlets and outlets of the above enumerated pair of devices and having a common portion of merger downstream of the point of inclusion of said means in said conduit, and means slidably related to said common portion to open one or both of the by-passes of the series-connected devices in response respectively to a predetermined pressure relatively lower than the first-said predetermined pressure and to a pressure of intermediate magnitude with respect to said predetermined pressures.

6. In a pump-supplied fluid system, an intermittent fluid-consuming device connected to the pump discharge, a conduit connected in parallel to said device and including a pair of series-connected devices having inlets and outlets and through which fluid is circulated, said conduit further including a pressure movable single valve means between the pump discharge and the series-connected devices for opening to release pressure fluid into said conduit in response to a predetermined pump discharge pressure, two by-passes connecting the respective inlets and outlets of the above enumerated pair of devices and having a common portion downstream of the point of inclusion of said means in said conduit, and means shiftable with respect to the common portion to different positions determined by predetermined pressures for opening one or both of the by-passes of the series-connected devices.

7. A valve assembly comprising a pair of telescopically related valve and body members, said body member having a bore adapted to be supplied with pressure fluid adjacent one end thereof and having an outlet coverable and uncoverable by the valve member differing positions thereof, said valve member having one end continuously exposed to the fluid pressure in the said one end of the body member and being pressure movable for relative reciprocation away from and toward the latter for respectively opening and covering the outlet, means forming an axially extending recess in the said end of one of the members opposite the other member and adapted to contain fluid, a piston carried by the other member and slidable in the recess under the aforesaid relative motion of reciprocation between the valve assembly members, stop means between the piston and the floor of the recess engageable to limit the motion between the valve assembly members in one direction, permanently open shuttle passage means leading from one side of the piston to the other, and elastic means continuously acting to effect the limiting motion between valve assembly members in such one direction.

8. A valve assembly comprising a pair of telescopically related valve and body members, said body member having a bore adapted to be supplied with pressure fluid adjacent one end thereof and having an outlet controlled by the valve member, said valve member having one end continuously exposed to the fluid pressure in the said one end of the body member and being pressure movable for relative reciprocation away from and toward the latter for respectively opening and covering the outlet, said members being relatively relieved at one end so as to provide confronting recesses, one for anchoring a shanked member therein and the other adapted to contain fluid and slidably receiving an enlarged head portion formed on the shank member, said shanked member further having stop means between the head thereof and the floor of the confronting recess of the other said member and engageable to limit the motion between the valve assembly members in one direction, and having sufficient clearance with respect to the walls of the receiving recess to provide permanently open shuttle passage means leading from one side of the head of the shanked member to the other side, and elastic means continuously acting to effect the limiting motion between valve assembly members in such one direction.

9. A valve assembly comprising a pair of reciprocally related valve and body members, said body member having a bore adapted to be supplied with pressure fluid adjacent one end thereof and having an outlet coverable and uncoverable by the valve member, said valve member having one end continuously exposed to the fluid pressure in the said one end of the body member and being pressure movable for relative reciprocation away from and toward the latter for respectively opening and covering the outlet, means forming an axially extending recess in at least one end of the valve member opposite the body member, and having a piston fixed to the body member and slidable in the recess under the aforesaid relative motion of reciprocation between the valve assembly members, stop means between the piston and the floor of the recess engageable to limit the motion between the valve assembly members in one direction, and permanently open shuttle passage means leading from one side of the piston to the other, and elastic means continuously acting to effect the limiting motion between valve assembly members in such one direction.

10. Duplex valve structure comprising a reciprocating pair of companion slide valve elements, a common unitary valve body having tandem connected parallel valve receiving bores in closely spaced adjacency to one another provided with separate fluid inlets at one end of the valve body and slidably receiving the said valve elements, said bores being further provided with substantially transversely aligned separate outlets intermediate the respective ends thereof and controlled by the valve element in the corresponding bore, means communicatively connecting the inlet of one bore and the outlet of the other bore, separate stop means limiting the relative movement of approach of the valve elements with respect to the said one end of the valve body, and means continuously biasing the valve elements toward said one end of the valve body.

11. Duplex valve structure comprising a reciprocating pair of companion slide valve elements, a common unitary valve body having parallel valve receiving bores provided with separate fluid inlets at one end and slidably receiving the said valve elements, said bores being further provided with substantially transversely aligned separate outlets intermediate the respective ends thereof and controlled by the valve element in the corresponding bore, means communicatively connecting the inlet of one bore and the outlet of the other bore, separate stop means limiting the relative movement of approach of the valve elements with respect to the said one end of the valve body, and means continuously biasing the valve elements toward said one end of the valve body, said valve body and each valve element being relatively relieved at one end to provide sets of confronting recesses, one said stop means being disposed between each set of recesses and each having a lateral protrusion loosely sliding in one recess of the set and being anchored in the other recess of the same set for displacing and replenishing the supply of fluid in said one recess during reciprocation of the corresponding valve element.

12. In a pressure system supplied by a fluid discharging pumping means, an intermittent-fluid-consuming device connected to the pump discharge, a conduit connected in parallel to said device and including series-connected devices having inlets and outlets and through which fluid is circulated, said conduit further including a pressure movable single valve element between the pump discharge and the series-connected devices for opening to release pressure fluid through said conduit in response to a high motivating fluid pressure, two by-passes connecting the respective inlets and outlets of the above enumerated series-connected devices and having a common portion downstream of the point of inclusion of said valve element in said conduit, a pressure movable single valve element shiftably related to said common portion for progressively opening one or both of the by-passes in response respectively to a low fluid pressure and to a motivating fluid pressure higher than said low pressure but lower than said high pressure, and elastic means biasing said valve elements toward closed positions in opposition to the motivating fluid pressures.

13. In a pressure system supplied by a pressure creating fluid discharge means, a fluid receiver connected to the pump discharge, a conduit connected in parallel to said receiver and including series-connected filter and anti-friction bearing devices having inlets and outlets through which fluid in that order is circulated and further including a pressure movable single valve element between the fluid discharge and the series-connected devices for opening to release pressure fluid through said conduit in response to a high motivating fluid pressure, two by-passes connecting the respective inlets and outlets of the above enumerated series-connected devices and having a common portion downstream of the point of inclusion of said valve element in said conduit, a pressure shiftable single valve element slidably related to said common portion for progressively opening one or both of the by-passes in response respectively to a low fluid pressure and to a motivating fluid pressure higher than said low pressure but lower than said high pressure, and elastic means biasing said valve elements toward closed positions in opposition to the motivating fluid pressures.

14. In a pressure system supplied by a fluid discharging pump, an intermittent-fluid-consuming device adapted to be connected to the pump discharge, a conduit connected hydraulically in parallel to said device and including series-connected devices having inlets and outlets and through which fluid is circulated, said conduit further including a pressure movable single valve plunger between the pump discharge and the series-connected devices and pressure depressible to release pressure fluid through said conduit in response to a high motivating fluid pressure, two by-passes connecting the respective inlets and outlets of the above enumerated series-connected devices and having a common portion downstream of the point of inclusion of said valve element in said conduit, a pressure depressible single valve plunger depressible with respect to said common portion for progressively opening one or both of the by-passes in response respectively to a low fluid pressure and to a motivating fluid pressure higher than said low pressure but lower than said high pressure, and elastic means biasing said valve elements toward closed positions in opposition to the motivating fluid pressures.

15. Duplex valve structure comprising a reciprocating pair of companion slide valve elements, a common unitary valve body having a pair of parallel valve receiving bores provided with separate fluid inlets at one end and slidably receiving the said valve elements, said bores being further provided with substantially transversely aligned separate outlets intermediate the respective ends thereof and controlled by the valve element in the corresponding bore, means communicatively connecting the inlet of one bore and the outlet of the other bore, separate stop means limiting the relative movement of approach of the valve elements with respect to the said one end of the valve body, separate piston-carrying first stud means between the valve body and each of said elements and extending non-interferingly past the inlet of the corresponding valve receiving bore, and second fluid container recess means loosely receiving the piston-carrying stud means such that relative reciprocation of the piston of the latter will cause displacement and replenishment of fluid in the recess means as received from the corresponding bore inlet, both of the just named first and second means forming self-contained two-way dashpots in the valves and at least one such means being stationary and another being connected for movement with a valve element so as to dampen an area of the valve element and appropriately impede movement of the same.

16. Duplex valve structure comprising a reciprocating pair of companion slide valve elements, a common unitary valve body having parallel valve receiving bores provided with separate fluid inlets at one end and slidably receiving the said valve elements, said bores being further provided with substantially transversely aligned separate outlets intermediate the respective ends thereof and controlled by the valve element in the corresponding bore, means communicatively connecting the inlet of one bore and the outlet of the other bore, separate stop means limiting the relative movement of approach of the valve elements with respect to the said one end of the valve body, separate piston-carrying first stud means between the valve body and each of said elements and extending non-interferingly past the inlet of the corresponding valve receiving bore, and second fluid container recess means restrictively communicating with the corresponding bore inlet and receiving the piston-carrying stud means such that reciprocation of the latter will cause restricted displacement and replenishment of fluid in the recess means as received from such bore inlet, at least one of the just-named first and second means being stationary and another being connected for movement with a valve element so as effectively to dampen the valve element and appropriately impede movement of the same.

17. A pump-supplied pressure fluid system comprising fluid receiving means, a conduit connected in parallel to said means and including series connected filter and anti-friction bearings having inlets and outlets through which fluid in that order is circulated and further including a pressure movable single valve element between the pump discharge and the series connected devices for opening to introduce pressure fluid into said conduit in response to a high motivating fluid pressure, two by-passes connecting the respective inlets and outlets of the named filter and anti-friction bearings and having a common portion downstream of the point of inclusion of said valve element in said conduit, a pressure shiftable single valve element slidably related to said common portion for progressively opening one or both of the by-passes in response respectively to a low motivating fluid pressure and to a motivating fluid pressure higher than said low pressure but lower than said high pressure, and elastic means biasing said valve elements toward closed positions in opposition to the motivating fluid pressures.

18. Duplex valve structure comprising a reciprocating pair of companion slide valve elements, a common unitary valve body having tandem connected parallel valve receiving bores in closely spaced adjacency to one another and provided with separate fluid inlets at one end of the valve body and slidably receiving the respective valve elements, one of the bores being further provided with a plurality of longitudinally spaced outlets disposed along the path of reciprocation of the slide valve element therein and between the respective ends of the bore, the other bore having a separate valve controlled outlet substantially transversely aligned with respect to one outlet of said plurality and communicatively connected to the inlet of said one bore, separate stop means limiting the relative movement of approach of the valve elements with respect to the said one end of the valve body, and means continuously biasing the valve elements toward said one end of the valve body.

19. A pump-supplied pressure fluid system comprising fluid receiver means, a conduit connected in parallel to said means and including a plurality of series connected fluid consuming devices through which fluid is circulated in sequence, duplex valve structure including a common unitary valve body having first and second parallel valve receiving bores provided with separate fluid inlets at one end, said first bore having its inlet connected to the pump discharge and receiving a pressure movable single valve element slidable in response to a high motivating fluid pressure to open and close an outlet in the bore leading to said series connected devices, said second bore having a plurality of longitudinally spaced outlets corresponding in number to the series connected devices aforesaid and forming by-passes around the inlets of the same respectively, the outlet of said first bore being substantially transversely aligned with respect to one outlet of said plurality and being communicatively connected to the inlet of said second bore, an outlet-covering single valve element slidably received in said second bore and being pressure movable for progressively opening one or more of said by-passes in response respectively to a low motivating fluid pressure and to a motivating fluid pressure higher than said low pressure but lower than said high pressure, separate piston carrying stud means between the valve body and each of said elements and extending non-interferingly past the inlet of the corresponding valve receiving bore, and elastic means biasing said valve elements toward closed positions in opposition to the motivating fluid pressures.

20. Duplex valve structure comprising a reciprocating pair of pressure movable companion slide valve elements, a common unitary valve body having parallel valve receiving bores in closely spaced adjacency to one another and provided with separate fluid inlets and slidably receiving the respective pressure movable valve elements, said bores being further provided with substantially transversely aligned separate outlets controlled by the valve element in the corresponding bore to yield a reduced outlet pressure, separate stop means limiting movement of approach of the pressure movable valve elements each with respect to an end of the valve body, means continuously biasing the valve elements each toward the appropriate end aforesaid of the valve body, the inlet of one of said bores being adapted to be connected to relatively high pressure so as to expose the adjacent pressure movable valve element therein to pressure adjustments proportionate to the high pressure, and means connecting the outlet of said one valve containing bore to the inlet of the other bore to expose the pressure movable valve element in the latter to the downstream pressure yielded by the former for adjusting the same but in proportion to the resulting reduced pressure from the former.

References Cited in the file of this patent

UNITED STATES PATENTS

| | | |
|---|---|---|
| 2,077,038 | Carrier | Apr. 13, 1937 |
| 2,112,032 | Leppla | Mar. 22, 1938 |
| 2,501,483 | Taylor | Mar. 21, 1950 |
| 2,521,239 | McDowall | Sept. 5, 1950 |
| 2,529,423 | Schou | Nov. 7, 1950 |
| 2,654,382 | Ball et al. | Oct. 6, 1953 |
| 2,663,995 | Price et al. | Dec. 29, 1953 |